United States Patent
Yoshida et al.

(10) Patent No.: US 9,806,664 B2
(45) Date of Patent: Oct. 31, 2017

(54) RANGE SWITCHOVER APPARATUS

(71) Applicant: DENSO CORPORATION, Kariya, Aichi-pref. (JP)

(72) Inventors: Kazuhiro Yoshida, Tokoname (JP); Jun Yamada, Nagoya (JP); Masaaki Shinojima, Chiryu (JP)

(73) Assignee: DENSO CORPORATION, Kariya (JP)

( * ) Notice: Subject to any disclaimer, the term of this patent is extended or adjusted under 35 U.S.C. 154(b) by 674 days.

(21) Appl. No.: 13/947,567

(22) Filed: Jul. 22, 2013

(65) Prior Publication Data

US 2014/0028231 A1 Jan. 30, 2014

(30) Foreign Application Priority Data

Jul. 30, 2012 (JP) .................................. 2012-168103

(51) Int. Cl.
| | |
|---|---|
| *H02P 31/00* | (2006.01) |
| *F16H 61/32* | (2006.01) |
| *F16H 61/00* | (2006.01) |
| *F16H 61/24* | (2006.01) |
| *G06N 99/00* | (2010.01) |

(52) U.S. Cl.
CPC ............. *H02P 31/00* (2013.01); *F16H 61/32* (2013.01); *F16H 2061/0053* (2013.01); *F16H 2061/247* (2013.01); *F16H 2061/326* (2013.01); *G06N 99/005* (2013.01)

(58) Field of Classification Search
CPC .................................. H02J 5/005; H02J 7/025
USPC .............................. 318/701, 561, 400.42, 139
See application file for complete search history.

(56) References Cited

U.S. PATENT DOCUMENTS

| | | | | |
|---|---|---|---|---|
| 3,863,520 A | * | 2/1975 | Moline .................... | F16H 59/04 74/473.23 |
| 5,233,883 A | * | 8/1993 | Stuhr ........................ | G05G 5/04 116/249 |
| 5,525,768 A | * | 6/1996 | Cobb, III .............. | F16H 59/105 200/11 G |

(Continued)

FOREIGN PATENT DOCUMENTS

| | | |
|---|---|---|
| JP | 2009-144794 | 7/2009 |
| JP | 2012-013216 | 1/2012 |

OTHER PUBLICATIONS

Office Action (3 pages) dated May 19, 2014, issued in corresponding Japanese Application No. 2012-168103 and English translation (4 pages).

*Primary Examiner* — Paul Ip
*Assistant Examiner* — Devon Joseph
(74) *Attorney, Agent, or Firm* — Nixon & Vanderhye P.C.

(57) ABSTRACT

When electric power supply is started, an initial driving operation is performed to switch over a power supply phase of a motor in open-loop control. Initial learning processing is performed to learn a phase deviation correction value for the power supply phase relative to a count value of a pulse signal of an encoder. As a restraint caused by a shape of a detent mechanism, the motor need be rotationally driven so that a detent lever does not move in a negative direction beyond a bottom position of a P-range in the initial driving operation. In a case of performing the initial learning processing in the P-range in consideration of this restraint, the initial learning processing is performed by setting a rotation direction of the motor.

4 Claims, 8 Drawing Sheets

(56) References Cited

U.S. PATENT DOCUMENTS

| | | | | |
|---|---|---|---|---|
| 5,727,426 A * | 3/1998 | Lykken | G05G 5/06 | 74/526 |
| 5,794,748 A * | 8/1998 | Heuver | B60T 1/005 | 188/31 |
| 2003/0222617 A1* | 12/2003 | Nakai et al. | | 318/701 |
| 2005/0235769 A1* | 10/2005 | Kliemannel | F16H 59/0204 | 74/473.1 |
| 2006/0138880 A1* | 6/2006 | Kimura | F02N 19/005 | 310/68 B |
| 2006/0207372 A1* | 9/2006 | Mochizuki | F16H 59/10 | 74/473.1 |
| 2009/0000411 A1* | 1/2009 | Nakayama | F16H 63/3466 | 74/335 |
| 2009/0108791 A1* | 4/2009 | Isobe | F16H 61/32 | 318/561 |
| 2010/0206118 A1* | 8/2010 | Nagashima | F16H 61/18 | 74/473.18 |
| 2011/0068730 A1* | 3/2011 | Nakai | F16H 61/32 | 318/563 |
| 2011/0089357 A1* | 4/2011 | Tan | F16K 11/0853 | 251/285 |
| 2012/0000309 A1* | 1/2012 | Takagi | F16H 59/70 | 74/473.1 |
| 2012/0103122 A1* | 5/2012 | Morrissett | F16H 59/10 | 74/473.25 |
| 2012/0234124 A1* | 9/2012 | Nozaki | F16H 61/32 | 74/473.12 |
| 2012/0252628 A1* | 10/2012 | Tsutsumi | B60L 11/14 | 477/19 |
| 2014/0007729 A1* | 1/2014 | Fredriksson | F16H 59/0278 | 74/473.21 |
| 2014/0028231 A1* | 1/2014 | Yoshida | H02P 31/00 | 318/400.42 |
| 2014/0144273 A1* | 5/2014 | Kato | F16H 59/0204 | 74/473.21 |
| 2014/0373660 A1* | 12/2014 | Benson | F16H 59/0278 | 74/473.21 |

\* cited by examiner

RANGE SWITCHOVER APPARATUS

CROSS REFERENCE TO RELATED APPLICATION

This application is based on and incorporates herein by reference Japanese patent application No 2012-168103 filed on Jul. 30, 2012.

FIELD

The present disclosure relates to a range switchover apparatus, which switches over a shift range by a motor as a drive source.

TECHNICAL BACKGROUND

Recently mechanical drive systems are changed to electrical motor-drive systems in vehicles to meet requests for reducing space, improving assembling work and improving control ability. As one exemplary apparatus, a motor is used to drive a shift range switchover mechanism of an automatic transmission of a vehicle. This apparatus has an encoder, which outputs a pulse signal in synchronism with a predetermined angular rotation of a motor, and switches over a shift range to a target shift range by rotationally driving the motor to a target rotation position (target count value) based on a count value of the pulse signal of the encoder (encoder count value) at a shift range switchover time.

In a system, in which the encoder count value is not stored at the time of turning off the electric power supply, the encoder count value does not correspond to an actual rotation position (power supply phase) of the motor at time immediately after the electric power supply is turned on next time. The encoder count value and the power supply phase need be matched by matching the encoder count value and the actual rotation position of the motor after the power supply is turned on so that the power supply phase of the motor is switched over in correspondence to the encoder count value.

Patent document JP-A-2009-112151A (US 2009/0108791 A1) proposes initial learning processing, which is executed as follows. When power supply is turned on in a vehicle, a motor is driven initially by switching over a power supply phase of the motor one cycle sequentially in a predetermined time schedule in open-loop control so that a power supply phase and a rotation position of the motor are matched in either one of power supply phases and a pulse signal of an encoder is counted. When the initial driving operation of the motor is finished, a correction value of a deviation of the power supply phase (learning value of initial position deviation) relative to an encoder count value is learned based on a relation between the encoder count value and the power supply phase. During normal drive control, which follows the initial learning control, the motor is rotationally driven by switching over the power supply phase of the motor sequentially in correspondence to a corrected encoder count value, which is determined by correcting the encoder count value by the power supply phase deviation correction value.

The patent document further proposes re-execution of the initial learning processing, when the learning result is determined to be a failure as a result of checking whether the learned result is correct (success or failure of learning) based on patterns of an A-phase signal and a B-phase signal of the encoder at the time of finishing the initial driving operation processing. In the re-execution of the initial learning processing, the direction of rotation of the motor is reversed from the preceding direction of rotation in the initial driving operation.

In the initial driving operation, the rotational driving of the motor is occasionally restricted depending on a shape of a detent mechanism, which holds the range switchover mechanism in position at respective ranges. The restraint caused by the shape of the detent mechanism is not considered in the patent document. It is therefore likely that the motor is rotationally driven at the time of the initial driving operation against the restraint caused by the shape of the detent mechanism. As a result, the detent mechanism and the range switchover mechanism are likely to be heavily loaded in the initial driving operation. This load will shorten durability of the detent mechanism and the range switchover mechanism or cause range skipping, by which the shift range is switched over unintentionally at the time of the initial driving operation.

SUMMARY

It is therefore an object to provide a range switchover apparatus, which prevents a motor from being rotationally driven against a restraint caused by a shape of a detent mechanism at initial driving time.

According to one aspect, a range switchover apparatus includes a range switchover mechanism having a motor as a drive source for switching over a shift range among plural ranges, a detent mechanism for holding the range switchover mechanism at each range position, an encoder for outputting a pulse signal in synchronism with rotation of the motor, and a control unit. The control unit executes an initial driving operation, in which power supply phases of the motor is switched over by open-loop control after electric power is turned on, and performs initial learning processing, which learns a phase deviation correction value corresponding to a phase deviation of a power supply phase relative to an encoder count value indicating a count value of the pulse signal of the encoder. In a normal driving operation following the initial learning processing, the encoder count value is corrected by the phase deviation correction value, and the motor is rotationally driven by sequentially switching over the power supply phases in accordance with a corrected encoder count value. The control unit rotates the motor first in a predetermined direction corresponding to a restraint caused by a shape of the detent mechanism in performing the initial learning processing. The predetermined direction ensures the detent mechanism to hold the range switchover mechanism at a predetermined range position more surely than other direction.

BRIEF DESCRIPTION OF THE DRAWING

The above and other features and advantages will become more apparent from the following detailed description made with reference to the accompanying drawings. In the drawings.

DETAILED DESCRIPTION OF THE EMBODIMENT

First Embodiment

Figure 1:
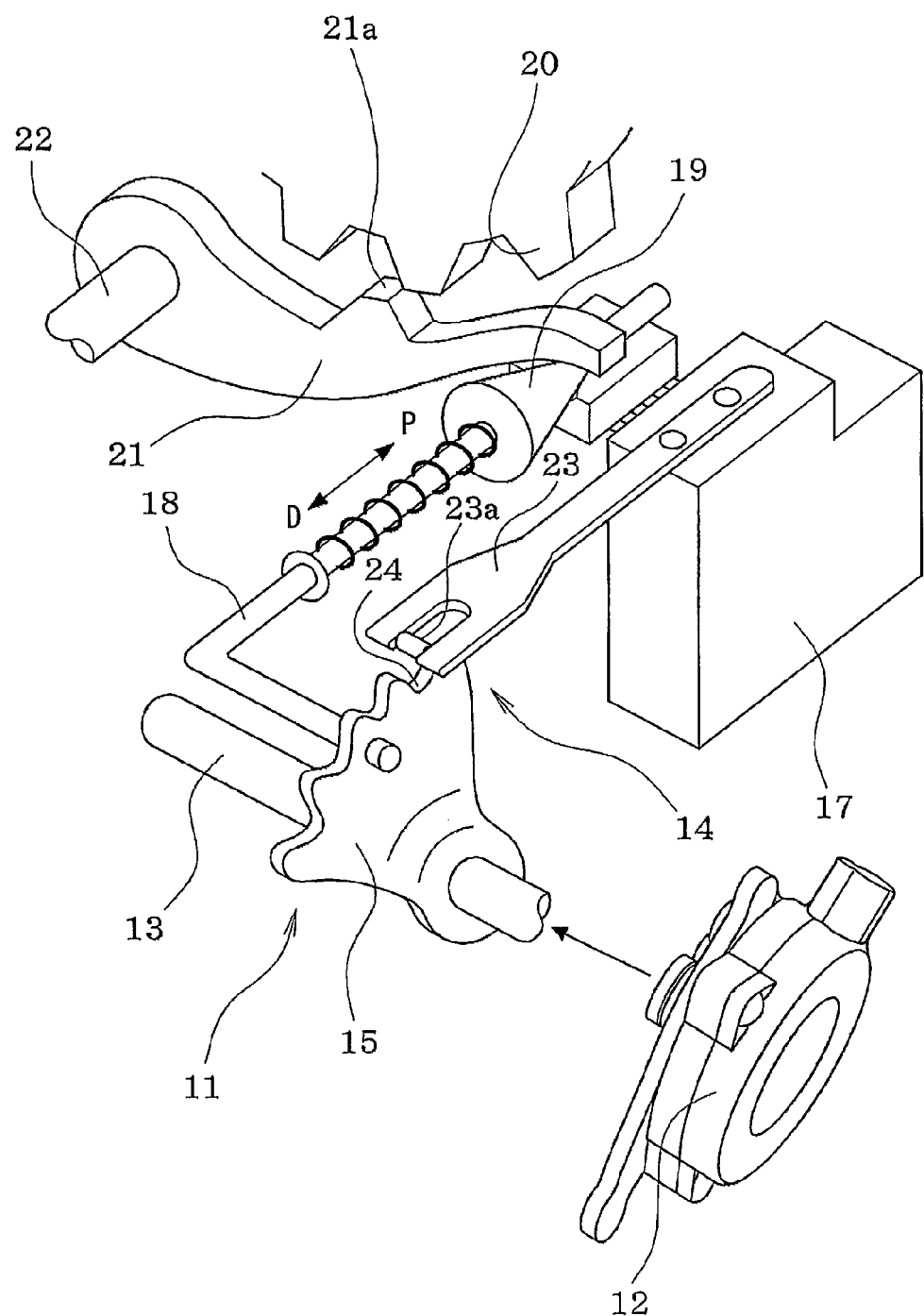
FIG. 1 is a schematic perspective view of a shift range switchover apparatus according to a first embodiment.
Figure 2:
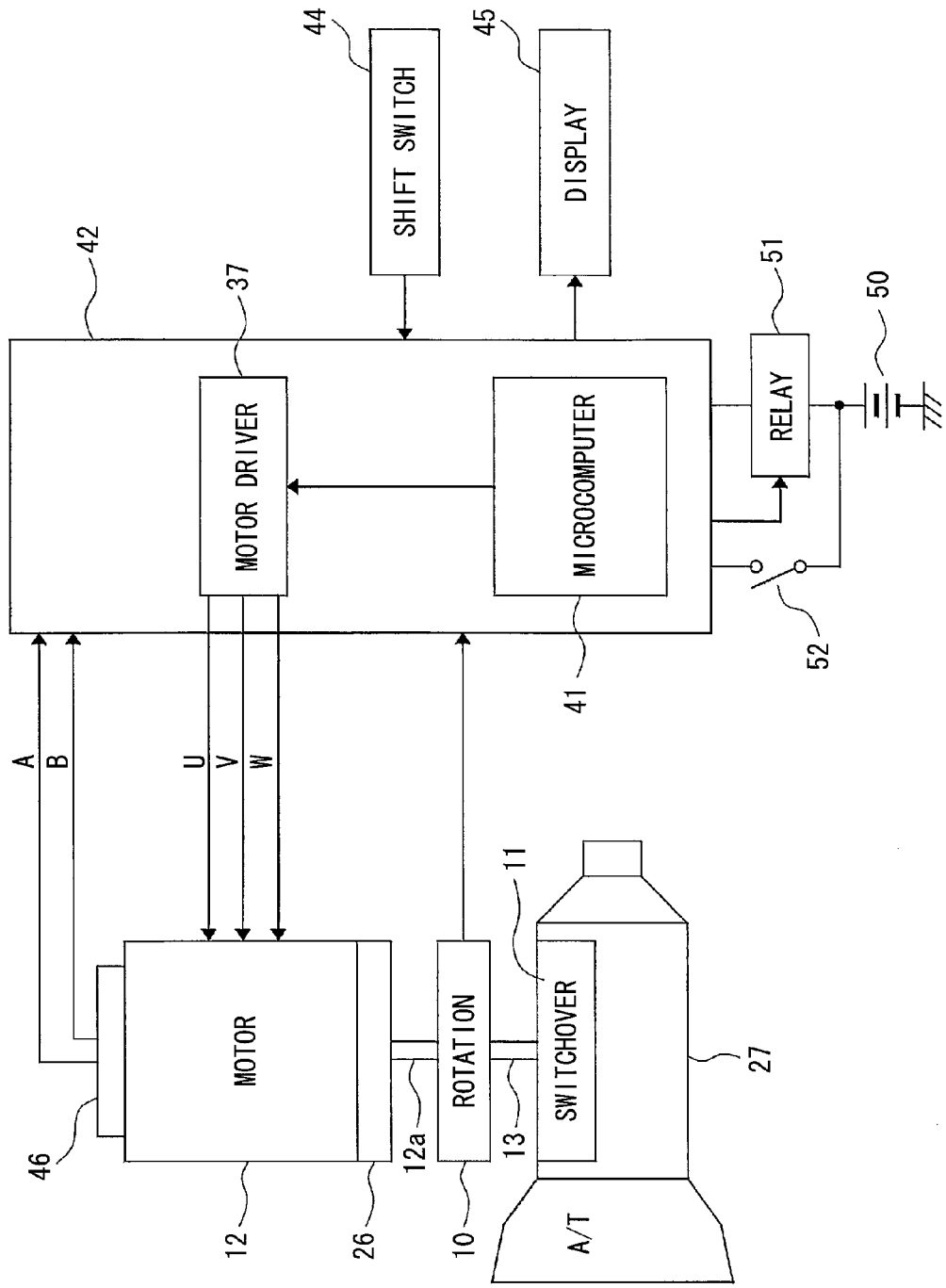
FIG. 2 is a schematic electric diagram showing an entire control system of the first embodiment.

Referring first to FIG. 1 and FIG. 2, a range switchover mechanism 11 is configured as a four-position shift range switchover mechanism, which switches over a shift range of an automatic transmission 27 of a vehicle among a parking range (P-range), a reverse range (R-range), a neutral range (N-range) and a drive range (D-range). The range switchover mechanism 11 uses as its drive source an electric motor 12, which is for example a switched reluctance motor. The motor 12 has a reduction mechanism 26 therein and has an output shaft sensor 10 provided as a rotation detection sensor, which detects a rotation position of its output shaft 12a. A manual shaft 13 is coupled to the output shaft 12a of the motor 12. A detent lever 15 is fixed to the manual shaft 13.

A manual valve (not shown) is coupled to the detent lever 15 to move linearly in correspondence to rotation of the detent lever 15. The manual valve is provided to switch over a hydraulic pressure circuit (not shown) in the automatic transmission 27 for switching over a shift range.

An L-shaped parking rod 18 is fixed to the detent lever 15. A conical body 19 provided at a top end of the parking rod 18 contacts a lock lever 21. The lock lever 21 moves up and down about a pivot shaft 22 in correspondence to a position of the conical body 19 to lock and unlock a parking gear 20. The parking gear 20 is provided about the output shaft of the automatic transmission 27. When the parking gear 20 is locked by the lock lever 21, drive wheels of a vehicle are held in a rotation-stop state (parking state).

A detent spring 23 is fixed to a support base 17 for holding the detent lever 15 in each of shift ranges P, R, N and D. The detent lever 15 is formed in a fan shape with plural range holding recesses 24 (FIG. 3) in correspondence to the shift ranges P, R, N and D. When an engagement member 23a provided at the top end of the detent spring 23 falls to fit in any one of the range holding recesses 24, the detent lever 15 is held in the corresponding one of the shift ranges. The detent lever 15 and the detent spring 23 form a detent mechanism 14, which engages and holds a rotation position of the detent lever 15 in the corresponding one of positions of the shift ranges, that is, holds the range switchover mechanism 11 in corresponding one of positions of the shift ranges.

In the P-range, the parking rod 18 is moved in a direction to approach the lock lever 21 so that a large-diameter part of the conical body 19 lifts the lock lever 21 to fit a protrusion 21a of the lock lever 21 in the parking gear 20 and lock the parking gear 20. Thus the output shaft of the automatic transmission 27 (drive wheels) is held in the locked state (parking state).

In the other ranges than the P-range, the parking rod 18 is moved in a direction leaving away from the lock lever 21, the large-diameter part of the conical body 19 is pulled out of the lock lever 21 to lower the lock lever 21 and disengage the protrusion 21a of the lock lever 21 from the parking gear 20. As a result, the output shaft of the automatic transmission 27 is held in a rotatable state (vehicle travel state).

The output shaft sensor 10 formed as the rotation detection sensor (for example, a potentiometer) outputs a voltage corresponding to a rotation angle of the output shaft 12a of the reduction mechanism 26 of the motor 12. It is thus possible to confirm whether the actual shift range is the P-range, the R-range, the N-range or the D-range based on the output voltage. Even when the output shaft sensor 10 is not provided, an encoder 46 described later can confirm whether the actual shift range is either one of the P-range, the R-range, the N-range and the D-range.

As shown in FIG. 2, the motor 12 is provided with an encoder 46, which detects a rotation angle (rotation position) of a rotor of the motor 12. The encoder 46 may be magnetic rotary-type encoder. The encoder 46 is configured to output pulse signals of A-phase and B-phase to a range switchover control apparatus 42 in synchronism with rotation of the rotor of the motor 12 at every predetermined angular interval. The range switchover control apparatus 42 is provided with a microcomputer 41, which counts both rising edge and falling edge of the A-phase signal and the B-phase signal outputted from the encoder 46. Further the microcomputer 41 rotationally drives the motor 12 by switching over the power supply phase of the motor 12 in a predetermined sequence based on the count value (encoder count value). It is possible to provide two systems, each including three-phase (U, V, W) coils of the motor 12 and a motor driver 37, so that, even when one system fails, the motor 12 is rotationally driven by the other system.

While the motor 12 is in rotation, the direction of rotation of the motor 12 is determined based on the order of generation of the A-phase signal and the B-phase signal. The encoder count value is counted up in a case of rotation in a positive direction (direction of rotation for switching over from P-range to D-range). The encoder count value is counted down in a case of rotation in a negative direction (negative direction of rotation for switching over from D-range to P-range). Thus, even when the motor 12 is rotated in any one of the positive direction and the negative direction, the relation of correspondence between the encoder count value and the rotation angle of the motor 12 is maintained. It is therefore possible to detect the rotation position of the motor 12 based on the encoder count value in any one of the normal rotation (positive direction) and the reverse rotation (negative direction) and rotationally drive the motor 12 by supplying electric power to a phase coil, which corresponds to the detected rotation position.

The range switchover control apparatus 42 receives a signal indicating a shift lever operation position detected by a shift switch 44. The microcomputer 41 of the range switchover control apparatus 42, which is provided as a control unit) thus switches over a target shift range in response to the shift lever operation or the like of a driver, switches over the shift range by driving the motor 12 in correspondence to the target shift range, and displays the switched-over actual shift range on a display unit 45 provided in an instrument panel (not shown) in the vehicle.

The range switchover control apparatus 42 is supplied with a power supply voltage from a battery 50 (power source) mounted on the vehicle through a power supply relay 51. The power supply relay 51 is turned on and off by manually turning on and off an IG switch 52 (ignition switch) provided as a power supply switch. When the IG switch 52 is turned on, the power supply relay 51 is turned on to apply the power supply voltage to the range switchover control apparatus 42. When the IG switch 52 is turned off, the power supply relay 51 is turned off to shut off power supply to the range switchover control apparatus 42.

Since the encoder count value is stored in a RAM (not shown) of the microcomputer 41, the stored encoder count value disappears when the power supply to the range switchover control apparatus 42 is turned off. The encoder count value of the range switchover control apparatus 42 available at the time immediately after turning on the power supply, that is, before starting motor control for the automatic transmission, does not correspond to the actual rotation position (power supply phase) of the motor 12. It is therefore necessary to match the encoder count value and the actual rotation position of the motor 12 after the power supply is turned on so that the encoder count value and the power supply phase correspond to each other, for switching over the power supply phase in accordance to the encoder count value.

The microcomputer 41 therefore performs initial learning processing, which learns a relation between a power supply phase and an encoder count value of the motor 12 by initially driving the motor 12 after the power supply is turned on. In this initial learning processing, a switchover of the power supply phase of the motor 12 is attained one cycle sequentially in a predetermined time schedule in open-loop control so that a power supply phase and a rotation position of the motor 12 are matched in either one of power supply phases and the motor 12 is driven to rotate. Then edges of the A-phase signal and the B-phase signal of the encoder 46 are counted. When the initial driving operation of the motor 12 is finished, a relation of correspondence among the encoder count value, the rotation position of the motor 12 and the power supply phase is learned so that a correction value of a deviation of the power supply phase relative to the encoder count value is learned.

The microcomputer 41 checks whether the initial learning processing is performed successfully or unsuccessfully based on the pattern of the A-phase signal and the B-phase signal of the encoder 46 at the time of finishing the initial driving operation for the initial learning processing. If the initial driving learning processing is determined to be a failure, the initial driving learning processing is performed again. The success or failure of the initial driving learning processing may be determined as follows. For example, the motor 12 is rotationally driven in a 1-2 phase power supply method in the initial driving operation, and the initial driving operation is finished when the motor 12 is driven to a position, at which two phases are supplied with power. If the pattern of the A-phase signal and the B-phase signal of the encoder at the time of finishing the initial driving operation does not correspond to a two-phase power supply, the initial learning processing is the failure.

In a normal driving operation following the initial learning processing (after learning of the correction value of phase deviation of the power supply phase), the encoder count value is corrected by the correction value of the phase deviation of the power supply phase. The motor 12 is rotationally driven by switching over the power supply phases of the motor 12 sequentially in accordance with the corrected encoder count value.

Figure 3:
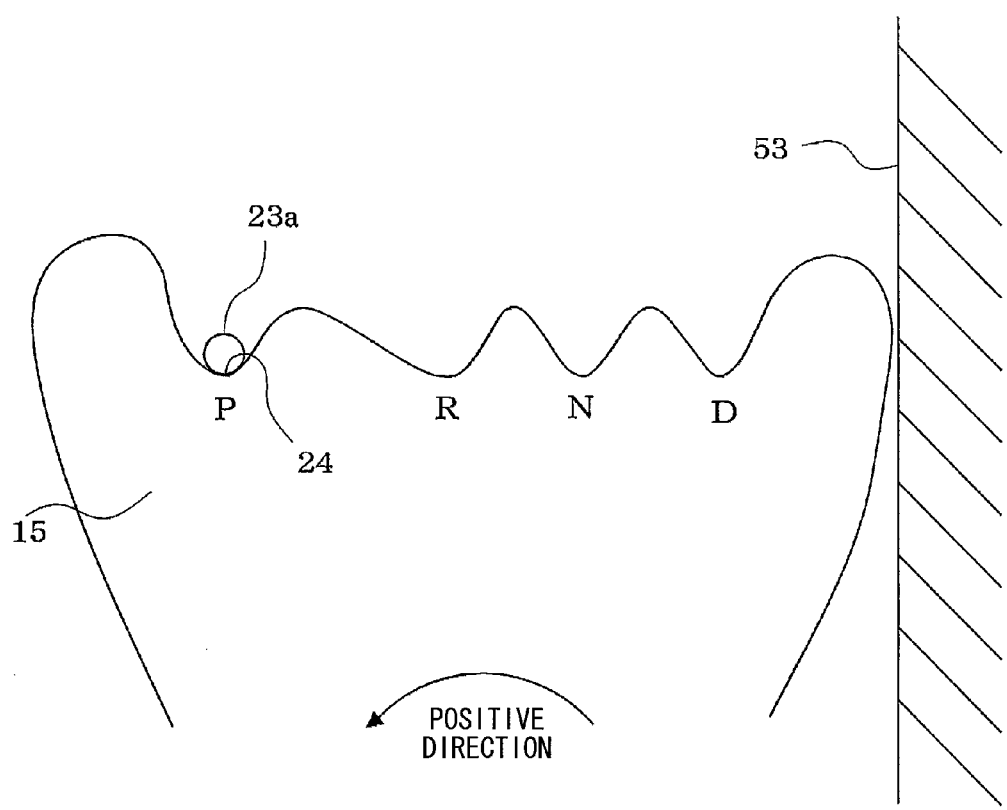
FIG. 3 is a schematic view showing a restraint caused by a shape of a detent mechanism in the first embodiment.

As shown in FIG. 3, it is assumed that a P-wall 53 (limitation member) is provided to restrain a movable range of the detent mechanism 14. When the detent lever 15 contacts this P-wall 53, the movable range of the P-range side of the detent mechanism 14 is restrained.

The P-wall position, at which the detent lever 15 contacts the P-wall 53, is close to a bottom position of the P-range (the engagement part 23a is fitted deep into the bottom or valley of the range holding recess 24 of the P-range). When the detent lever 15 moves in a more negative direction (direction to approach the P-wall position) than the bottom position of the P-range at the time of initial driving operation, the lever 15 contacts the P-wall 53 to apply excessive load to the detent mechanism 14 and the range switchover mechanism 11. This excessive load thus tends to lower durability of the detent mechanism 14 and the range switchover mechanism 11. As a restraint caused by the shape of the detent mechanism 14, the motor 12 need be rotationally driven so that the lever 15 is not moved in the more negative direction than the bottom position of the P-range (that is, the detent lever 15 does not contact the P-wall 53) at the time of initial driving operation.

Figure 5:
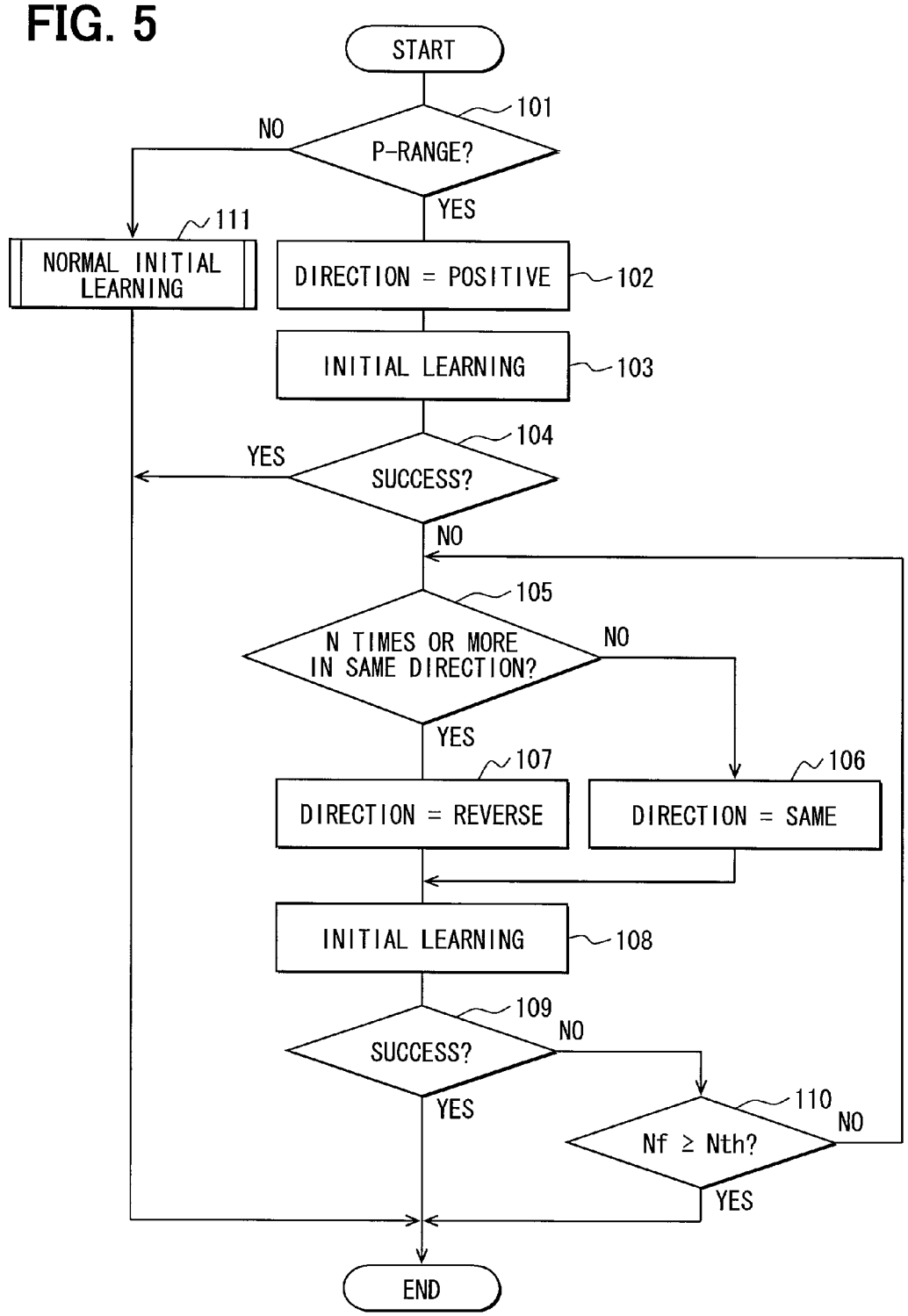
FIG. 5 is a flowchart showing the initial learning control in the first embodiment.

Therefore, the microcomputer 41 is configured to execute the initial learning routine, which is shown in FIG. 5 and described below, in consideration of the above-described restraint. The initial learning processing is performed by setting the direction of rotation of the motor 12 so that the detent lever 15 does not contact the P-wall 53. That is, the direction of rotation of the motor 12 for the initial learning processing is first set in the positive direction so that the detent mechanism 15 is more likely to be held in a predetermined shift range position (P-range) than in the negative direction. Even when the initial learning processing is unsuccessful, the initial learning processing is performed again in view of the restraint by setting the direction of rotation of the motor 12 so that the detent lever 15 does not contact the P-wall 53.

Figure 4:
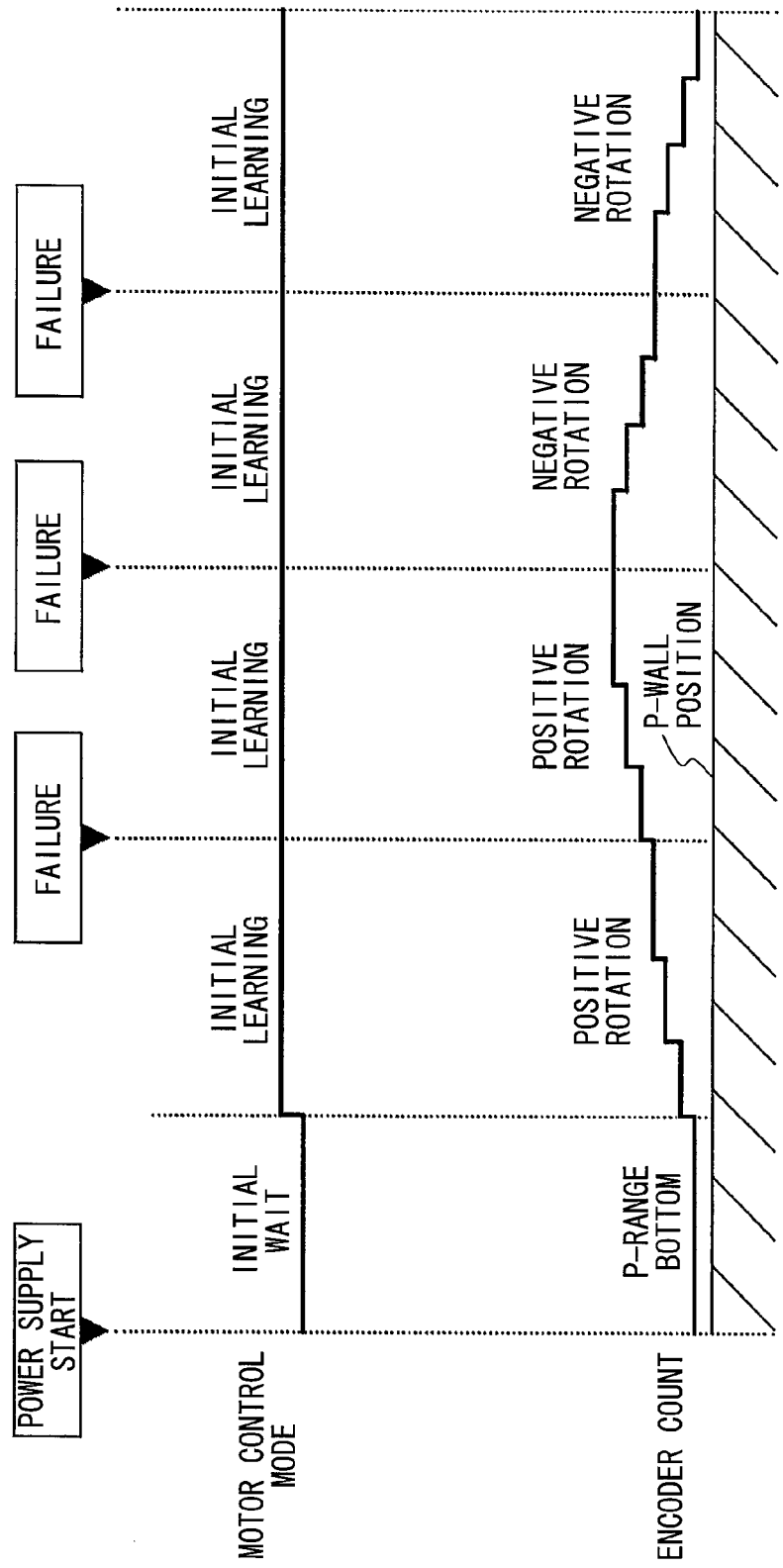
FIG. 4 is a time chart showing initial learning control in the first embodiment.

Specifically, as shown in FIG. 4, when the initial learning control processing is performed in the P-range after the microcomputer 41 is activated (after power supply is turned on and started), the initial learning processing is performed by setting the rotation direction of the motor 12 in the positive rotation direction (direction for leaving from the P-wall position). It is thus possible to perform the initial learning processing by rotationally driving the motor 12 so that the detent lever 15 does not move in the more negative direction than the bottom position of the P-range (that is, the detent lever 15 does not contact the P-wall 53) at the time of initial driving operation.

After the initial learning processing is performed, it is checked each time whether the initial learning processing is finished successfully. If it is not successful, that is, it is failure, the initial learning processing is performed again. When the initial learning processing is performed N times (for example, two times) in succession with the motor 12 set to rotate in the positive direction, the initial learning processing is performed again by setting the motor 12 to rotate in the negative direction (direction for approaching the P-wall position). When the initial learning processing is repeated N times in succession with the motor 12 set to rotate in the negative direction, the initial learning processing is repeated further by setting the motor 12 to rotate in the positive direction, that is, by reversing the rotation direction of the motor 12 again. It is thus possible to perform the initial learning processing by driving the motor 12 so that the detent lever 15 is not moved in more negative direction from the bottom position of the P-range (that is, the detent lever 15 does not contact the P-wall) at the time of initial driving operation.

The initial learning processing described above is executed by the microcomputer 41 of the range switchover control apparatus 42 according to the initial learning routine shown in FIG. 5. The processing of this routine will be described below.

The initial learning routine shown in FIG. 5 is executed immediately as an initial learning part after the microcomputer 41 of the range switchover control apparatus 42 is activated. When this routine is started, it is checked first at step 101 whether the present range is the P-range based on, for example, the output voltage of the output shaft sensor 10. This checking whether the present range is the P-range is not limited to the method described above but may be executed by different method.

If it is determined at step 101 that the present range is the P-range, step 102 is executed to set the rotation direction of the motor 12 to the positive rotation direction. Then at step 103 the initial learning processing is executed.

It is then checked at step 104 whether the initial learning processing is finished successfully. If it is determined that the initial learning processing resulted in success, this routine is finished without executing step 105 and subsequent steps.

If it is determined at step 104 that the initial learning resulted in failure (initial learning processing is not finished successfully), step 105 is executed to check whether the initial learning processing is executed N times (for example, two times) or more while holing the rotation direction of the motor 12 in the same direction as in the previous time. N is not limited to two but may be different from two.

If the check at step 105 results in NO, that is, the initial learning processing is not executed N times or more under the same rotation direction of the motor 12, step 106 is executed to set the rotation direction of the motor 12 to the same direction as the previous time. Then step 108 is executed to execute the initial learning processing again.

If the check at step 105 results in YES, that is, the initial learning processing is performed N times or more under the same rotation direction of the motor 12, step 107 is executed to set the rotation direction of the motor 12 to the negative direction as opposed to the previous time, that is, the rotation direction is reversed. Then step 108 is executed to execute the initial learning processing again under the reversed rotation direction of the motor 12.

It is checked at step 109 whether the initial learning processing is finished successfully. If it is determined that the initial learning processing is not successful, step 110 is executed to check whether the number of times of failure Nf of the initial learning processing is equal to predetermined number Nth (for example, four times) or more. If the number of times of failure is less than the predetermined number of times, step 105 and subsequent steps are repeated again.

If it is determined at step 109 that the initial learning processing is successful or it is determined at step 110 that the number of times of failure is equal to the predetermined number or more, this routine is finished.

If it is determined at step 101 that the present range is not the P-range (it is any one of the R-range, the N-range and the D-range), step 111 is executed to execute normal initial learning processing. In this normal initial learning processing, the rotation direction of the motor 12 is set to the predetermined direction (either the positive rotation direction or the negative rotation direction). Then it is checked whether the initial learning processing is successful. If it is determined that the initial learning processing is not successful, the rotation direction of the motor 12 is reversed from that of the previous time and the initial learning processing is performed again with the reversed rotation direction of the motor 12.

In the embodiment described above, the initial learning processing is performed by setting the rotation direction of the motor 12 in consideration of restraint caused by the shape of the detent mechanism 14. It is thus possible to prevent the motor 12 from being rotationally driven against the restraint caused by the shape of the detent mechanism 14 at the time of the initial driving operation. The initial learning processing can be attained by rotationally driving the motor 12 within an appropriate range, which is not against the restraints caused by the shape of the detent mechanism 14.

More specifically, as the restraint caused by the shape of the detent mechanism 14, it is assumed that the motor 12 is rotationally driven so that the detent lever 15 does not move in the negative direction beyond the bottom position of the P-range (that is, the detent lever 15 does not contact the P-wall 53) in the initial driving operation. In consideration of this restraint, the initial learning processing is executed by setting the rotation direction of the motor 12 so that the detent lever 15 does not contact the P-wall. As a result, the detent mechanism 14 and the range switchover mechanism 11 are protected from being heavily loaded in the initial drive operation and the durability of the detent mechanism 14 and the range switchover mechanism 11 are improved.

Further, even when the initial learning processing fails, the initial learning processing is performed again by setting the rotation direction of the motor 12 in consideration of the restraint caused by the shape of the detent mechanism 14. As a result, even when the initial learning processing is performed again because of failure of the initial learning processing, the initial learning processing can be attained by rotationally driving the motor 12 within an appropriate range, which is not against the restraint caused by the shape of the detect mechanism 14.

Second Embodiment

A second embodiment of a shift range switchover apparatus will be described next with reference to FIG. 6 to FIG. 8. Substantially the same parts as in the first embodiment will not be described in detail, and only parts different form the first embodiment will be described.

Figure 6:
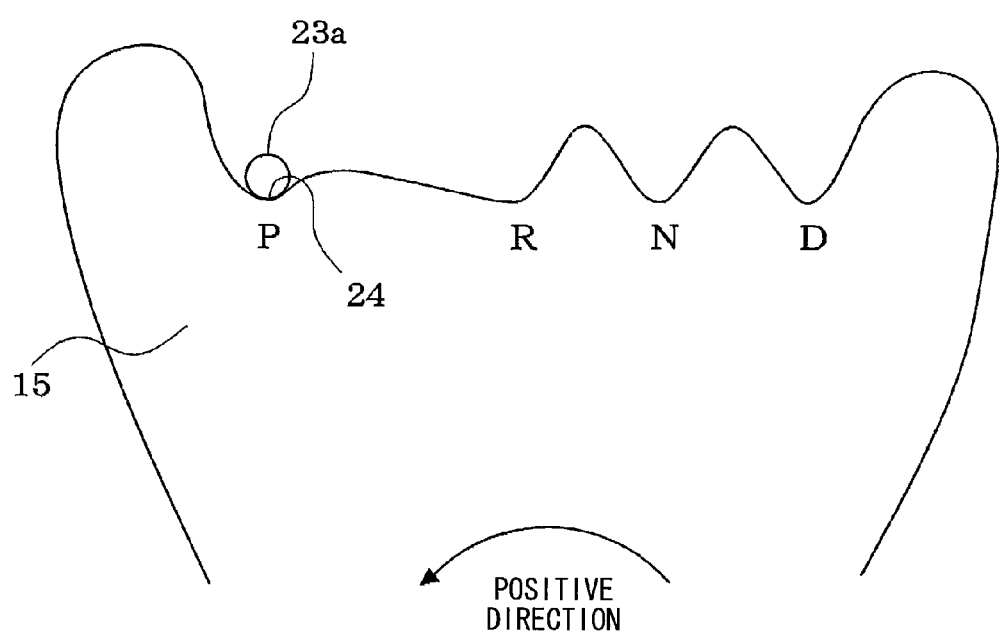
FIG. 6 is a schematic view showing a restraint caused by a shape of a detent mechanism in a second embodiment.

As shown in FIG. 6, a depth of the shift range holding recess 24 for the P-range of the detent mechanism 14 (range for allowing the engagement member 23a to fall in the recess 24 of the P-range in a stop state of the motor 12) is shallow, because a mountain top between the recesses for the P-range and the R-range is lower than the other mountain tops, for example, mountain top between the R-range and the N-range. That is, a holding range for holding the shift range in the P-range is narrower than in the first embodiment. When the detent lever 15 moves in the positive direction beyond the bottom position of the P-range at the time of initial driving for the initial learning, it is likely that the engagement member 23a deviates from the holding range of the P-range and the shift range will be switched over against the will of a driver. Accordingly, as the restraint caused by the shape of the detent mechanism 14, the motor 12 need be rotationally driven so that the detent lever 15 will not move in the positive direction beyond the bottom position of the P-range at the time of initial driving (that is, the engagement member 23a will not be disengaged from the holding range of the P-range). The direction of rotation of the motor 12 for the initial learning processing is first set in the negative direction so that the detent lever 15 is more likely to be held in a predetermined shift range position (P-range) than the positive direction.

Figure 8:
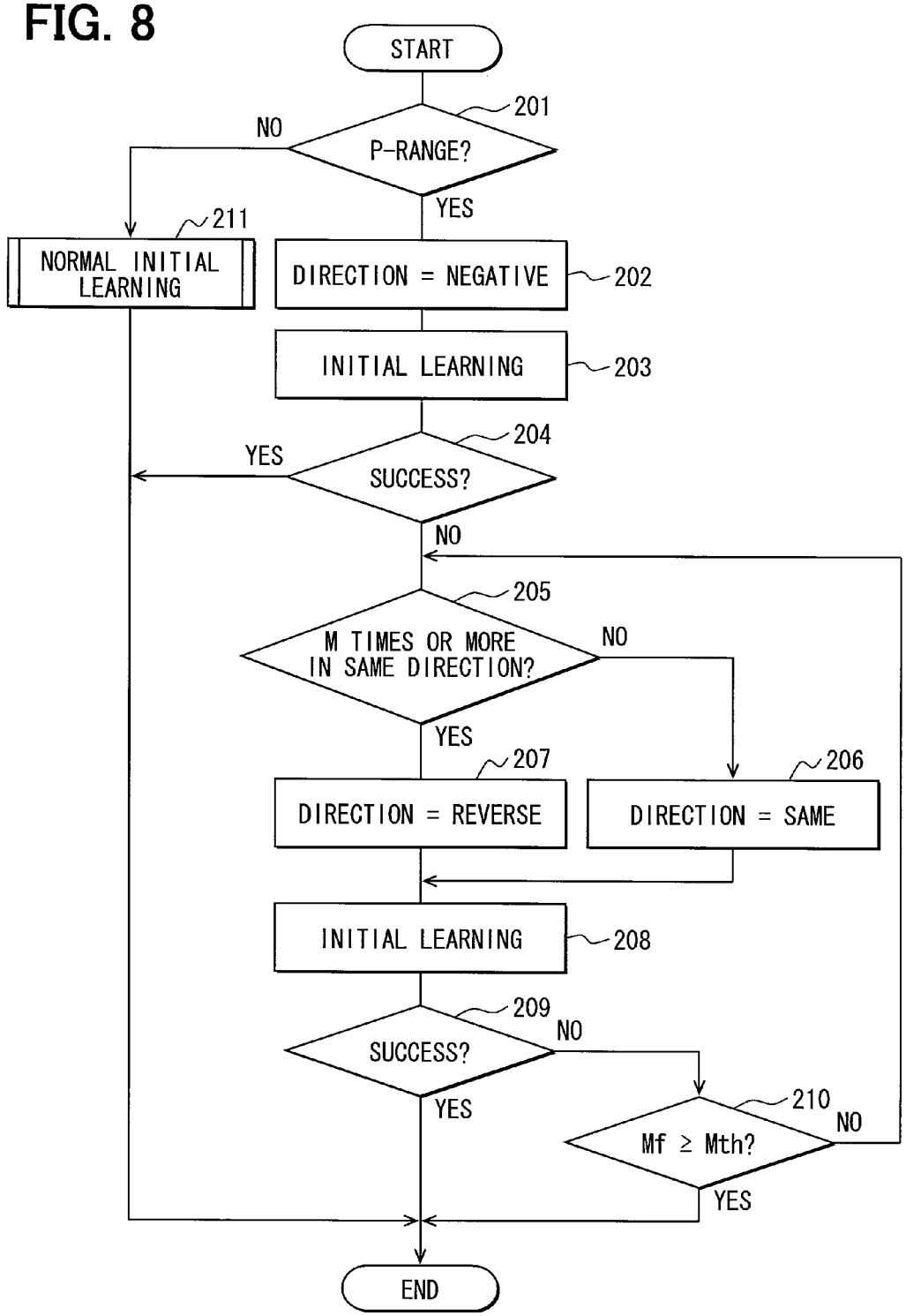
FIG. 8 is a flowchart showing the initial learning control in the second embodiment.

Therefore, the microcomputer 41 performs initial learning processing, which is shown in FIG. 8 and will be described later. That is, in consideration of the restraint, the initial learning processing is performed by setting the rotation direction of the motor 12 so that the engagement member 23a will not be disengaged from the holding range of the P-range. Even when the initial learning processing fails, the initial learning processing is performed again by setting the rotation direction of the motor 12 so that the engagement member 23a will not be disengaged from the holding range of the P-range.

Figure 7:
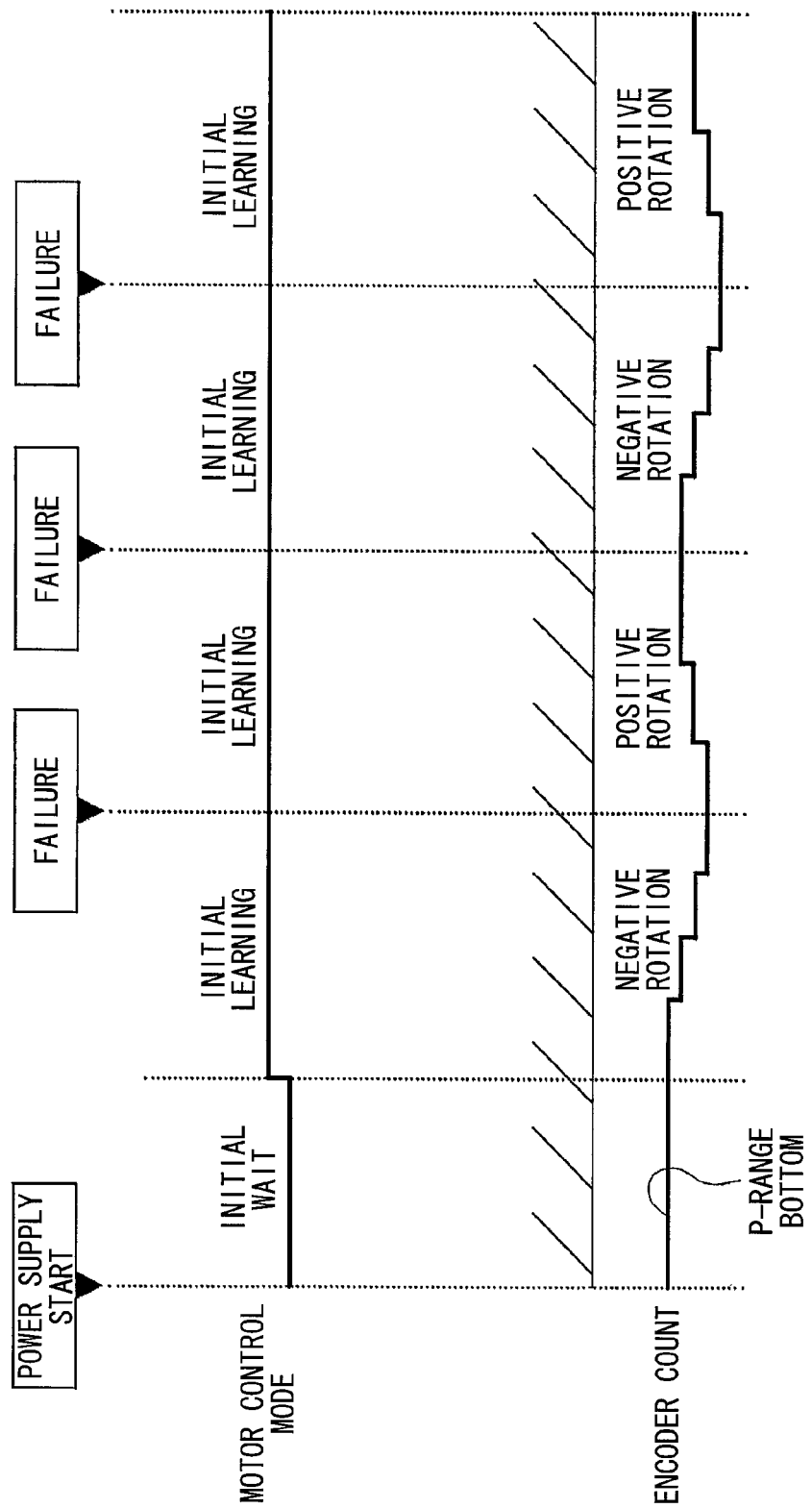
FIG. 7 is a time chart showing initial learning control in the second embodiment.

Specifically, as shown in FIG. 7, when the initial learning processing is performed in the P-range after the microcomputer 41 is activated (power supply is started), initial learning processing is performed by setting initially the rotation direction of the motor 12 in the negative rotation direction. It is thus possible to execute the initial learning processing by rotationally driving the motor 12 so that the detent lever 15 will not move in the positive direction beyond the bottom position of the P-range. Thus, the engagement member 23a will not move over the low mountain top between the recesses 24 for the P-range and the R-range, and will not move out of the holding range of the P-range.

Each time the initial learning processing is performed, it is checked whether the initial learning processing is performed successfully. If it is not successful, it is executed again. When the initial learning processing is performed M times (for example, once) with the motor 12 set to rotate in the negative direction, the initial learning processing is performed again by setting the motor 12 to rotate in the positive direction. When the initial learning processing is repeated M times in succession with the motor 12 set to rotate in the positive direction, the initial learning processing is repeated further by setting the motor 12 to rotate in the negative direction, that is, by reversing the rotation direction of the motor 12 again. It is thus possible to execute the initial learning processing by rotationally driving the motor 12 so that the detent lever 15 is not moved in the positive direction beyond the bottom position of the P-range (that is, the engagement member 23 is not disengaged from the holding range of the P-range) at the time of initial driving operation.

In the initial learning processing shown in FIG. 8, it is checked first at step 201 whether the present range is the P-range. If it is determined that the present range is the P-range, step 202 is executed to set the rotation direction of the motor 12 to the negative rotation direction. Then at step 203 the initial learning processing is performed.

It is then checked at step 204 whether the initial learning processing is finished successfully. If it is determined that the initial learning resulted in failure, step 205 is executed to check whether the initial learning processing is executed M times (for example, once) or more while holing the rotation direction of the motor 12 in the same direction as in the previous time M is not limited to one but may be different from one.

If the check at step 205 results in NO, that is, the initial learning processing is not executed M times or more under the same rotation direction of the motor 12, step 206 is executed to set the rotation direction of the motor 12 to the same direction as the previous time. Then step 208 is executed to execute the initial learning processing again.

If the check at step 205 results in YES, that is, the initial learning processing is performed M times or more under the same rotation direction of the motor 12, step 207 is executed to set the rotation direction of the motor 12 to the direction, which is reverse to the direction of the previous time. Then step 208 is executed to execute the initial learning processing again.

It is checked at step 209 whether the initial learning processing is finished successfully. If it is determined that the initial learning processing is not successful, step 210 is executed to check whether the number of times of failure of the initial learning processing Mf is equal to a predetermined number Mth (for example, four times) or more. If the number of times of failure is less than the predetermined number of times, step 205 and subsequent steps are repeated again.

If it is determined at step 209 that the initial learning processing is successful or it is determined at step 210 that the number of times of failure is equal to the predetermined number or more, this routine is finished.

If it is determined at step 201 that the present range is not the P-range (it is any one of the R-range, the N-range and the D-range), step 211 is executed to execute the normal initial learning.

In the second embodiment described above, the initial learning processing is performed by setting the rotation direction of the motor 12 in consideration of the restraint, which requires that the motor 12 need be rotationally driven so that the detent lever 15 does not move in the positive direction beyond the bottom position of the P-range (that is, the engagement member 23a is not disengaged from the holding range of the P-range) at the time of initial driving operation. It is thus possible to prevent that the shift range is switched over unintentionally at the time of the initial driving operation.

In the first and the second embodiments described above, the initial learning processing is performed in the P-range. However, the initial learning processing is not limited to those embodiments but may be implemented to perform the initial learning processing in a range (R-range, N-range or D-range) other than the P-range.

For example, in a case that, as the restraint caused by the shape of the detent mechanism 14, the motor 12 need be rotationally driven to prevent the detent lever 15 from moving in the positive direction beyond the bottom position of the D-range (that is, the detent lever 15 does not contact a D-wall) at the time of initial driving operation, the shift range switchover apparatus may be applied in executing the initial learning processing in the D-range.

Further, in a case that, as the restraint caused by the shape of the detent mechanism 14, the motor 12 need be rotationally driven to prevent the detent lever 15 from moving in the negative direction beyond the bottom position of the R-range (that is, the engagement member 23a is not disengaged from the holding range of the R-range) at the time of initial driving operation, the present disclosure may be applied in performing the initial learning processing in the R-range.

In the above-described embodiments, a magnetic-type encoder is used as the encoder 46. However the encoder 46 is not limited to such a type but may be an optical-type encoder or a brush-type encoder. The encoder 46 is not limited to the type, which outputs the A-phase signal and the B-phase signal, but may be a type, which outputs a Z-phase signal for correction (for indexing) in addition to the A-phase signal and the B-phase signal.

In the above-described embodiments, the switched reluctance motor (SR motor) is used as the motor 12. However, the motor 12 is not limited to the SR motor but may be other kinds of brushless-type synchronous motor as far as it is a brushless-type synchronous motor, which detects a motor rotation position based on a count value of an output signal of an encoder and switches over a power supply phase of the motor sequentially.

In the above-described embodiment, the shift range switchover apparatus is assumed to switch over a shift range among four ranges, P-range, R-range, N-range and D-range. However, the shift range switchover apparatus may have a range switch-over mechanism for switching over the shift range between two ranges of a P-range and a Non-P-range. Alternatively, it has a range switchover mechanism for switching over shift ranges among three shift ranges or five or more shift ranges.

The range switchover apparatus is not limited to the automatic transmission (AT, CVT, DCT and the like) but may be applied to a shift range switchover apparatus, which switches over a shift range of a speed reduction device of an electric vehicle.

What is claimed is:

1. A range switchover apparatus comprising:
    a range switchover mechanism having a motor as a drive source for switching over a shift range among plural ranges;
    a detent mechanism for holding the range switchover mechanism at each range position;
    an encoder for outputting a pulse signal in synchronism with rotation of the motor; and
    a control unit for executing an initial driving operation, in which power supply phases of the motor is switched over by open-loop control after electric power is turned on, and performing initial learning processing, which learns a phase deviation correction value corresponding to a phase deviation of a power supply phase relative to an encoder count value indicating a count value of the pulse signal of the encoder; wherein:
    in a normal driving operation following the initial learning processing, the encoder count value is corrected by the phase deviation correction value, and the motor is rotationally driven by sequentially switching over the power supply phases in accordance with a corrected encoder count value;
    the control unit rotates the motor first in a predetermined direction corresponding to a restraint caused by a shape of the detent mechanism in performing the initial learning processing, the predetermined direction ensuring the detent mechanism to hold the range switchover mechanism at a predetermined range position more surely than other direction;
    the range switchover apparatus further comprises a limitation member for limiting a movable range of the detent mechanism; and
    the control unit sets the predetermined direction of the motor to move the detent mechanism in a direction away from the limitation member in executing the initial driving operation so that the detent mechanism does not contact the limitation member; and
    said other direction is a direction toward the limitation member.

2. The shift range switchover apparatus according to claim 1, wherein
    the control unit executes, when the initial drive learning processing is unsuccessful, the initial learning processing in a same rotation direction of the motor in succession and in a reverse rotation direction of the motor after the initial drive learning processing has been performed a predetermined number of times in the same rotation direction.

3. A range switchover apparatus comprising:
    a range switchover mechanism having a motor as a drive source for switching over a shift range among plural ranges;
    a detent mechanism for holding the range switchover mechanism at each range position;
    an encoder for outputting a pulse signal in synchronism with rotation of the motor; and
    a control unit for executing an initial driving operation, in which power supply phases of the motor is switched over by open-loop control after electric power is turned on, and performing initial learning processing, which learns a phase deviation correction value corresponding to a phase deviation of a power supply phase relative to an encoder count value indicating a count value of the pulse signal of the encoder; wherein:
    in a normal driving operation following the initial learning processing, the encoder count value is corrected by the phase deviation correction value, and the motor is rotationally driven by sequentially switching over the power supply phases in accordance with a corrected encoder count value;
    the control unit rotates the motor first in a predetermined direction corresponding to a restraint caused by a shape of the detent mechanism in performing the initial learning processing, the predetermined direction ensuring the detent mechanism to hold the range switchover mechanism at a predetermined range position more surely than other direction;
    the detent mechanism is configured to hold the range switchover mechanism in each range position by an engagement member falling into an engagement recess when the range switchover mechanism is switched over to each range position;
    the control unit sets the predetermined direction of the motor so that the engagement member is not disengaged from a range, in which the engagement member slidingly falls, when the motor is in a stopped state;
    the detent mechanism is provided with mountain tops, which separate engagement recesses corresponding to the plural ranges, and one of the mountain tops is lower in height than other of the mountain tops; and
    the control unit sets the predetermined direction of the motor to move the one of the mountain tops, which is lower in height than the other of the mountain tops, of the detent mechanism away from the engagement in executing the initial driving operation so that the one of the mountain tops, which is lower in height than the other of the mountain tops, of the detent mechanism separates from the engagement member.

4. The shift range switchover apparatus according to claim 2, wherein
    the control unit executes, when the initial drive learning processing is unsuccessful, the initial learning processing in a same rotation direction of the motor in succession and in a reverse rotation direction of the motor after the initial drive learning processing has been performed a predetermined number of times in the same rotation direction.

* * * * *